No. 611,375. Patented Sept. 27, 1898.
R. COWEN.
VEHICLE TIRE.
(Application filed Dec. 6, 1897.)

(No Model.)

Witnesses:
Walter E. Lombard.
Edward F. Allen.

Inventor:
Robert Cowen,
by Crosby & Gregory,
Attys.

THE NORRIS PETERS CO., PHOTO-LITHO., WASHINGTON, D. C.

UNITED STATES PATENT OFFICE.

ROBERT COWEN, OF CAMBRIDGE, MASSACHUSETTS, ASSIGNOR TO THE BOSTON WOVEN HOSE AND RUBBER COMPANY, OF BOSTON, MASSACHUSETTS.

VEHICLE-TIRE.

SPECIFICATION forming part of Letters Patent No. 611,375, dated September 27, 1898.

Application filed December 6, 1897. Serial No. 660,874. (No model.)

*To all whom it may concern:*

Be it known that I, ROBERT COWEN, of Cambridge, county of Middlesex, State of Massachusetts, have invented an Improvement in Vehicle-Tires, of which the following description, in connection with the accompanying drawings, is a specification, like letters on the drawings representing like parts.

The object of my invention is to provide a yielding vehicle-tire, preferably one composed of solid rubber, with an inclosed or embedded securing device provided with mechanical means for rigidly and permanently locking the ends of the tire and its securing device together where they meet after being brought around the felly of the wheel.

In general terms a leading feature of my invention consists of embedding a wire in the tire, provided at its meeting ends with a sleeve having opposite perforations adjacent the ends of the wire, through which steel pins or tools may be driven to bend the ends of the wire back over the edge of the rear perforation to secure the tire against removal from the sleeve. Preferably there will be two wires, and they will be threaded through bridge-retaining links.

The details of construction of my invention will be more fully pointed out hereinafter in the following description and defined in the appended claims, reference being had to the accompanying drawings, illustrative of a preferred embodiment thereof, and in which—

Figure 1:
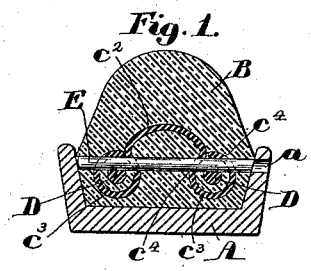
Figure 2:
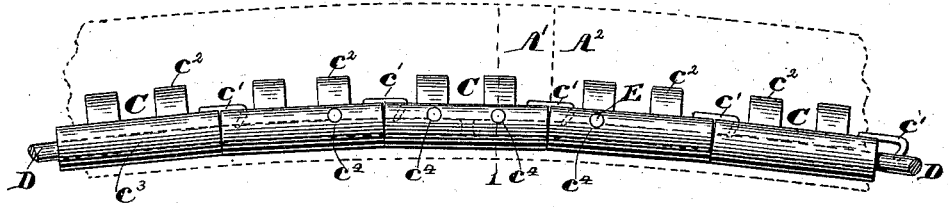
Figure 3:
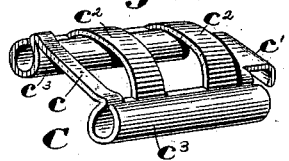
Figure 4:
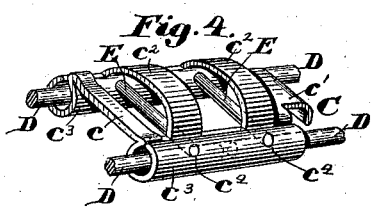
Figure 5:
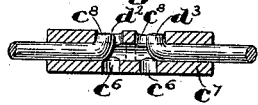
Figure 6:
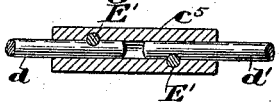
Figure 7:
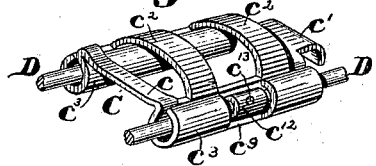
Figure 8:
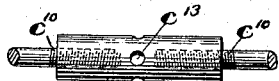

Figure 1 is a transverse vertical section taken on the line 1 1, Fig. 2. Fig. 2 is a fragmentary detail in side elevation. Fig. 3 is a perspective view of one of the retaining-links or bridge-pieces. Fig. 4 is a similar view in perspective showing a link provided with holding-wires and fastening devices. Figs. 5 and 6 are longitudinal sections showing modifications of my invention. Fig. 7 is a perspective view similar to Fig. 4, showing a modified means for securing the ends of the retaining-wires; and Fig. 8 is a fragmentary view, in side elevation, of a detail of the securing means shown in Fig. 7.

A designates any usual or preferred kind of steel or other rim, tire, or felly of a vehicle-wheel, on or in which is mounted any desired variety of yielding tire B, herein shown as a solid rubber tire.

As is well known, it has been exceedingly difficult to devise securing means for holding tires in this class of work because of the disruptive and dislodging strains due to the constant movement of the tire, frequently under heavy loads, and wires have been variously used for retaining the tire, being passed about the felly in grooves or otherwise, these wires having been secured by various means, including electrically welding their ends together. The latter, however, has proved exceedingly difficult and indeed impracticable under the circumstances. Accordingly I have devised an exceedingly neat, strong, and compact arrangement, as herein set forth, comprising in its complete and preferred embodiment a plurality of links C, having cross-bars $c$ at one end and hooks $c'$ at the other end to catch over said bars in chain fashion, anchors or bridges $c^2$ being provided intermediate the ends of the link for embedment therein, thereby retaining the tire rigidly and firmly on the links. At their edges the links are provided with rolls or tubular edges constituting carriers $c^3$, in which are supported retaining-wires D, preferably one on each side of the tire, these wires and links being preferably entirely embedded within the tire, as clearly shown in Fig. 1. Certain of the links have transverse perforations $c^4$, slightly eccentric to but in line with the wires D. In use steel or other hard pins E are driven into these perforations $c^4$, and forcibly cut into or bend down the contained wires D sufficiently to hold them with absolute firmness and prevent any longitudinal movement thereof, openings $a$ being preferably provided in the steel tire A, through which the pins E may be driven by a punch or other setting-tool. By this provision the ends of the tire may be brought together, as shown at A' A², Fig. 2, the projecting retaining-wires of one end being inserted in the carriers $c^3$ of the end link of the other end, and the whole is firmly and irremovably fastened together almost instantly simply by driving in two or more steel pins in the manner clearly shown in Figs. 1 and 2.

In certain cases it may be preferable or desirable not to use the links, but simply to use the retaining-wires in connection with a usual rubber tire or other tire, and in this case the wires will be brought together in a sleeve $c^5$, as indicated at $d\ d'$, Fig. 6, and locked by pins E' in the manner before set forth.

A further feature or form of my invention is shown in Fig. 5, where the ends of the wire, as indicated at $d^2\ d^3$, instead of being cut into by the steel pins are deflected by being punched laterally from their normal dotted-line position, Fig. 5, to the full-line position, the pin or other punch used being inserted through the openings $c^6$ in the sleeve $c^7$, the ends of the wire when bent over into their hooked position engaging the shoulders of opposite opening $c^8$.

The means of securing the retaining-wires, thereby holding the tires firmly and irremovably in place, as above described, is perfectly effective and at the same time requires no expensive or special apparatus, and, moreover, can be accomplished at a moment's notice and without special skill. Another practical and simple means for accomplishing this purpose is shown in Figs. 7 and 8, where it will be seen that a link C is cut away at $c^9$, so as to expose the meeting ends of the securing-wire, these ends being protected, as indicated at $c^{10}$, and joined by means of a right and left threaded nut $c^{12}$, having opposite perforations $c^{13}$, by means of which the nut is turned as a turnbuckle to draw the ends of the wire together.

If desired, the sleeves shown in Figs. 5 and 6 may be held in the intermediate opening at $c^9$ in the same manner as explained with reference to the nut $c^{12}$.

My invention is not limited to the precise details herein described, but is capable of considerable variation without departing from its true spirit and scope.

Having described my invention, what I claim as new, and desire to secure by Letters Patent, is—

1. The combination with a vehicle-tire, of a retaining-wire, and a sleeve or carrier, said wire having its ends brought together in said sleeve or carrier, said sleeve or carrier having opposite perforations, and said wire having its ends bent back over the edges of the rear perforations, substantially as described.

2. A vehicle-tire, comprising a yielding body or tire proper, having embedded in it at intervals a plurality of bridge-pieces, said bridge-pieces having carriers adapted to receive one or more retaining-wires, and a wire or wires passed through said carriers, substantially as described.

3. A vehicle-tire comprising a yielding body or tire proper having embedded in it at intervals a plurality of connected carriers adapted to receive one or more retaining-wires passing throughout the length of the tire, certain of said carriers having an intermediate opening, and means coöperating at said opening with the ends of the wire terminating in said carrier for fastening the wire in place, substantially as described.

4. A vehicle-tire, comprising a yielding body or tire proper, having embedded in it at intervals a plurality of bridge-pieces, flexibly connected together, said bridge-pieces having carriers adapted to receive one or more retaining-wires, a wire or wires passed through said carriers, certain of said carriers having transverse perforations adapted to receive a pin or tool, substantially as described.

5. A vehicle-tire comprising a yielding body or tire proper, having embedded in it at intervals a plurality of connected carriers adapted to receive one or more retaining-wires passing throughout the length of the tire, certain of said carriers having transverse perforations adjacent the contained ends of a wire or wires, and said ends being bent or hooked over the edges of said perforations, substantially as described.

6. A vehicle-tire, comprising a body portion having embedded in it a plurality of connected links, said links comprising one or more anchors to hold into the material of the tire, and carriers at their sides in the form of rolls or tubular edges, and wires run through said carriers throughout the length of the tire, certain of said carriers being perforated, and the ends of the wires terminating in said carriers being bent or hooked over the edges of said perforations, substantially as described.

In testimony whereof I have signed my name to this specification in the presence of two subscribing witnesses.

ROBERT COWEN.

Witnesses:
CHARLES L. TAYLOR,
GEORGE W. WHITTEMORE.